(12) United States Patent
Oh

(10) Patent No.: US 9,135,840 B2
(45) Date of Patent: Sep. 15, 2015

(54) MULTI-SECTIONED, BILLBOARD-MOUNTED LIGHT-EMITTING DEVICE

(76) Inventor: Wan Ho Oh, Daejeon (KR)

( * ) Notice: Subject to any disclaimer, the term of this patent is extended or adjusted under 35 U.S.C. 154(b) by 269 days.

(21) Appl. No.: 13/697,915

(22) PCT Filed: May 12, 2011

(86) PCT No.: PCT/KR2011/003500
§ 371 (c)(1),
(2), (4) Date: Nov. 14, 2012

(87) PCT Pub. No.: WO2011/142599
PCT Pub. Date: Nov. 17, 2011

(65) Prior Publication Data
US 2013/0063970 A1     Mar. 14, 2013

(30) Foreign Application Priority Data

May 14, 2010 (KR) .......................... 20-2010-0005081

(51) Int. Cl.
*F21V 7/04* (2006.01)
*G09F 13/18* (2006.01)
(Continued)

(52) U.S. Cl.
CPC .............. *G09F 13/18* (2013.01); *G02B 6/0036* (2013.01); *G02B 6/0088* (2013.01);
(Continued)

(58) Field of Classification Search
CPC .. G02B 6/0091; G02B 6/0088; G02B 6/0036; G09F 7/18; G09F 13/18; G09F 13/22; G09F 2013/1831; G09F 2013/1836; G09F 2013/222; G09F 2007/1843

USPC .............. 362/604, 633, 602, 613, 97.1–97.4; 40/624
See application file for complete search history.

(56) References Cited

U.S. PATENT DOCUMENTS 3,080,668 A * 3/1963 Reali ................................ 40/476
4,185,408 A * 1/1980 Tracy .............................. 40/564
(Continued)

FOREIGN PATENT DOCUMENTS

CN     1412468 A     4/2003
CN     1648517       8/2005
(Continued)

OTHER PUBLICATIONS

International Search Report for PCT/KR2011/003500 mailed Dec. 20, 2011.

*Primary Examiner* — Anh Mai
*Assistant Examiner* — Glenn Zimmerman
(74) *Attorney, Agent, or Firm* — Andrus Intellectual Property Law, LLP

(57) ABSTRACT

The present invention relates to a multi-sectioned, billboard-mounted light-emitting device comprising: a mounting frame onto which one or a plurality of partition pieces are joined by being slotted in a detachable fashion, and on the front of which are formed a plurality of billboard housing space parts; a light-emitting-diode module in which a plurality of LEDs are provided at predetermined intervals; a light-guide plate which surface emits due to the LEDs; a back-surface plate devised such that the light generated from the light-guide plate is emitted towards the front surface; and a billboard plate which is provided on the front surface of the light-guide plate while being received in a detachable fashion at a size matched to each of the billboard housing space parts which are section bared by means of the partition pieces.

8 Claims, 7 Drawing Sheets

(51) Int. Cl.
  *F21V 8/00* (2006.01)
  *G09F 7/18* (2006.01)
  *G09F 13/22* (2006.01)

(52) U.S. Cl.
  CPC ............... *G02B 6/0091* (2013.01); *G09F 7/18* (2013.01); *G09F 13/22* (2013.01); *G09F 2007/1843* (2013.01); *G09F 2013/1831* (2013.01); *G09F 2013/1836* (2013.01); *G09F 2013/222* (2013.01)

(56) References Cited

U.S. PATENT DOCUMENTS

2004/0172870 A1* 9/2004 Buring et al. .................. 40/590
2006/0117625 A1* 6/2006 Peterson .................... 40/611.01
2007/0176854 A1* 8/2007 Ward et al. ...................... 345/44
2008/0047184 A1* 2/2008 Dean ............................... 40/624
2010/0018097 A1* 1/2010 Xu ................................. 40/624
2012/0240438 A1* 9/2012 Pitcher et al. .............. 40/611.06

FOREIGN PATENT DOCUMENTS

| JP | 2001-210122 | 8/2001 |
| JP | 2005-156894 | 6/2005 |
| JP | 2007-335323 | 12/2007 |
| KR | 20-0396887 | 9/2005 |
| KR | 2020080000135 | 2/2008 |
| KR | 10-2008-0095738 | 10/2008 |
| KR | 20-0444788 | 6/2009 |

* cited by examiner

MULTI-SECTIONED, BILLBOARD-MOUNTED LIGHT-EMITTING DEVICE

RELATED APPLICATIONS

This application is a 371 application of International Application No. PCT/KR2011/003500, filed May 12, 2011, which in turn claims priority from Korean Patent Application No. 20-2010-0005081, filed May 14, 2010, each of which is incorporated herein by reference in its entirety.

TECHNICAL FIELD

The present invention relates to a multi-sectioned billboard-mounted light-emitting device which is characterized in that it is adapted to a billboard used at a diner, a restaurant, a highway rest area, etc., multiple billboards each having an advertisement text, an image, a graphic, a photo, etc. are selectively engaged and emit lights using a light emitting diode (LED) which can be well recognized at day and night time, and in particular to a multi-sectioned billboard-mounted light-emitting device which comprises an engaging frame configured in such a way that a plurality of billboard accommodation spaces are selectively formed at its front side as one or multiple section base are detachably inserted and engaged between an upper engaging part and a lower part which are horizontally provided upward and downward in a frame shape, and a lower accommodation groove is formed in a longitudinal direction at a back side of an upper surface of the lower part; a light emitting diode module which is positioned in an accommodated state while matching with an inner bottom surface of the lower accommodation groove of the lower part, and a printed circuit board having a corresponding length is provided at a lower side of a light guide plate, and a plurality of light emitting diodes (LED) are mounted at regular intervals on the upper surface of the printed circuit board; a light guide plate which is made from a transparent plate matching to an inner side of the engaging frame, and a plurality of scanning lines are formed in cut states in horizontal and vertical directions at its back side, and the LEDs are installed close at the lower side, and lights from the LEDs travel along the scanning lines and are reflected and emit; a back plate which comes into close contact with the back side of the light guide plate and emits light from the light guide plate to the front side; and a billboard on which are printed various texts, images or photos and which is detachably accommodated in each billboard accommodation space in a certain size which is divided by a section bar of the engaging frame and is installed at a front side of the light guide plate.

BACKGROUND ART

Various diners, restaurants and highway rest areas are using a billboard light emitting device with a billboard so as to advertise or promote the menu of various foods. The billboard light emitting device 1', as shown in FIG. 7, a lighting part 27' formed of one or multiple fluorescent lamp or common electric bulb in the interior of an engaging frame 2' formed in a rectangular shape, and a transparent billboard 26' on which is printed an image, a text, a graphic, a photo, etc. sowing various menu is provided on a front side, and the billboard 26' emits light from the lighting part 27' formed of a fluorescent lamp or a common electric bulb, so it can be easily recognized at day and night. The above mentioned light emitting device 1' is generally mounted on a front side of one billboard 26'. The diner or the restaurant where needs to advertise or promote using multiple photos and images on various foods tend to install multiple billboard light emitting devices 1' for the purpose of advertising or promoting various menu at a time, so that the user can easily select a certain menu from the multiple billboards 26'.

However the above mentioned conventional light emitting device 1' necessitates a plurality of light emitting devices 1' so as to advertise and promote various menu, and one billboard 26' is installed at each light emitting device 1', so the installation is hard, and a power consumption rises owing to maintaining multiple light emitting devices 1' at a time. If the size of the billboard 26' is needed to be made longer or shorter due to the exchange of a new menu or existing menu, it necessitates a new installation of another size light emitting device 1'. In addition, the billboard 26' of the front side is configured to emit light from the lighting part 27' formed of fluorescent lamp or electric bulb, so a wider space for installing the fluorescent lamps or the electric bulb is needed, and the front and back wise width and size of the light emitting device 1' are made larger, which makes it hard to install, and the visibility of the lighting part 27' such as the fluorescent lamp or electric bulb is worse than the light emitting device using light emitting devices, and the service life is shorter, so it is needed to frequently exchange it.

In addition, the Korean utility model registration number 20-0396887 discloses a billboard comprising a frame the front side of which is open, and the upper and lower sides of which are bent, a plurality of light emitting diodes which are arranged in the longitudinal direction of the frame, a block frame installed on the frame, and a plurality of billboard blocks which are assembled to the block frame; however in the above conventional billboard, the frame does not have any section bar, which makes it impossible to form multiple spaces. It lacks a light guide plate having cut scanning lines. As the multiple billboard blocks fit in series in the frame, the multiple billboard blocks with engraved billboard texts are configured to combine one advertisement text. In the above mentioned construction, the old billboard blocks are needed to be removed so as to form another advertisement text, and then the billboard blocks with engraved advertisement texts are reinstalled. So, the installation and assembling procedures grow complicated, and the exchange cost of the billboard blocks rises greatly.

DISCLOSURE OF INVENTION

Accordingly, the present invention is made to improve the above explained problems. It is an object of the present invention to provide a multi-sectioned billboard-mounted light-emitting device characterized in that a billboard insertion space formed of multiple section bars with various sizes is formed depending on a users selection, and a billboard fitting each billboard insertion space is detachably inserted, and a billboard with different sizes is configured to emit lights from one light emitting device for thereby improving visibility at day and night, and an exchange and detachment of a billboard are made easier, and one light guide plate is configured to emit lights by means of a light emitting diode module formed in a bar shape, and the billboards disposed at a front side emit light, and the thickness of the whole apparatus is slim, and the installation and engagement are easy, and the light can be efficiently emitted from one light emitting diode module.

To achieve the above objects, there is provided a multi-sectioned billboard-mounted light-emitting device which comprises an engaging frame configured in such a way that a plurality of billboard accommodation spaces are selectively formed at its front side as one or multiple section base are detachably inserted and engaged between an upper engaging part and a lower part which are horizontally provided upward and downward in a frame shape, and a lower accommodation groove is formed in a longitudinal direction at a back side of an upper surface of the lower part; a light emitting diode module which is positioned in an accommodated state while matching with an inner bottom surface of the lower accommodation groove of the lower part, and a printed circuit board having a corresponding length is provided at a lower side of a light guide plate, and a plurality of light emitting diodes (LED) are mounted at regular intervals on the upper surface of the printed circuit board; a light guide plate which is made from a transparent plate matching to an inner side of the engaging frame, and a plurality of scanning lines are formed in cut states in horizontal and vertical directions at its back side, and the LEDs are installed close at the lower side, and lights from the LEDs travel along the scanning lines and are reflected and emit; a back plate which comes into close contact with the back side of the light guide plate and emits light from the light guide plate to the front side; and a billboard on which are printed various texts, images or photos and which is detachably accommodated in each billboard accommodation space in a certain size which is divided by a section bar of the engaging frame and is installed at a front side of the light guide plate.

Advantageous Effects

According to the present invention, one or multiple section bars are detachably installed at a rectangular engaging frame in a horizontal direction, and a billboard insertion space formed of multiple section bars having different sizes can be installed depending on a users selection. The billboard fitting each billboard insertion space can be inserted and engaged in a detachable way, so the billboard with different sizes can be lighted from one light emitting device, thus increasing visibility at day and night. The exchange and detachment of the billboard can be easily performed. One light guide plate can emit light in whole by means of a bar-shaped light emitting diode module, so the whole billboards positioned on the front come to emit light. The thickness of the whole apparatus is slim, and the installation and engagement are easy, and the efficient light emission can be obtained by means of one light emitting diode.

Figure 1:
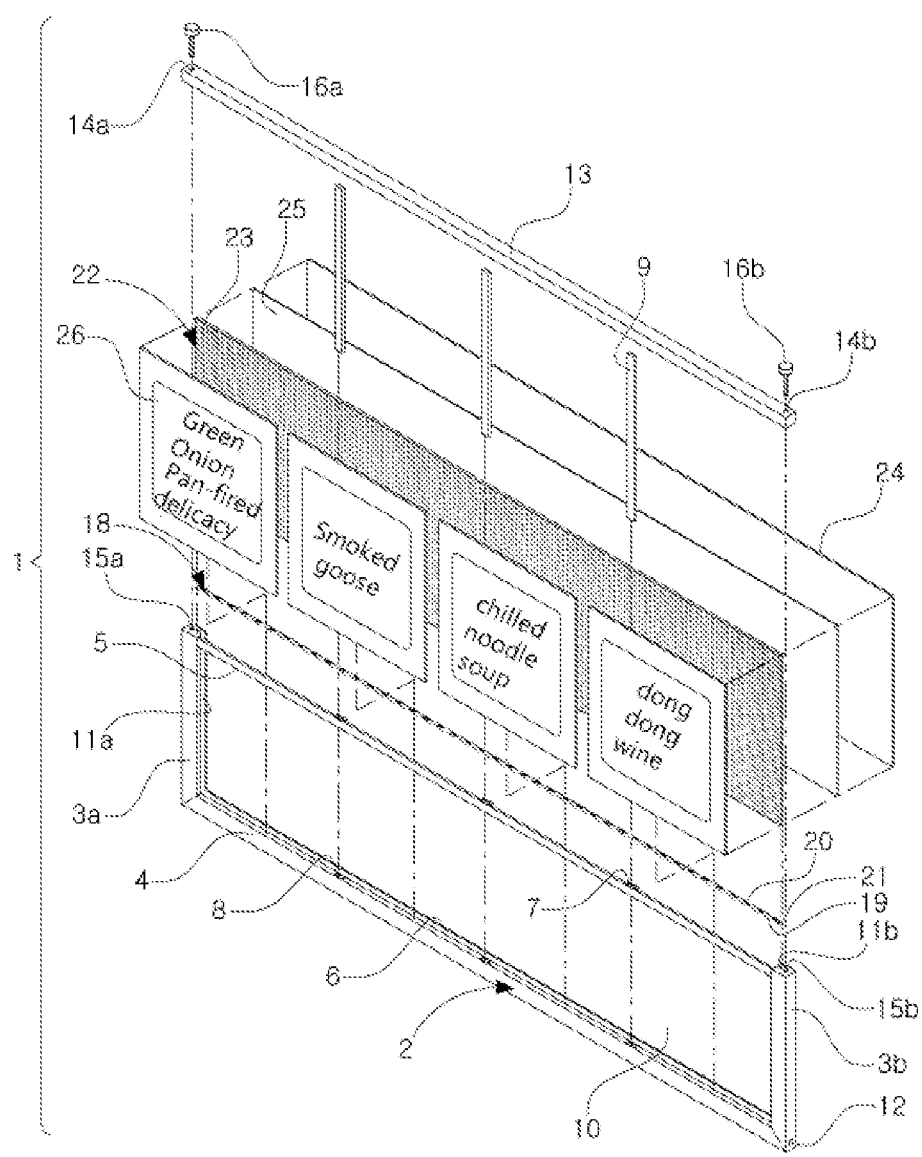
FIG. 1 is a schematic perspective view illustrating the whole disassembled state of a multi-sectioned billboard-mounted light-emitting device according to the present invention.

| | |
|---|---|
| 1, 1': light emitting device | 2, 2': engaging frame |
| 3a, 3b: side parts | 4: lower part |
| 5: upper engaging part | 6: lower accommodation groove |
| 7: section bar upper engaging part | 8: section bar lower engaging part |
| 9: section bar | 10: billboard accommodation space |
| 1a, 11b: side accommodation groove | 12: electric power connection hole |
| 13: upper cover | 14a, 14b: through holes |
| 15a, 15b: female screw hole | 16a, 16b: fixing bolt |
| 17: upper insertion groove | 18: light emitting diode module |
| 19: printed circuit board | 20: LED |
| 21: electric power connection terminal | 22: light guide plate |
| 23: scanning line | 24: back plate |
| 25: reflection film | 26, 26': billboard |
| 27': lighting part | |

BEST MODES FOR CARRYING OUT THE INVENTION

The preferred embodiments of the present invention will be described with reference to the accompanying drawings.

The multi-sectioned billboard-mounted light-emitting device 1 according to the present invention, as shown in FIGS. 1 to 6, is directed to light emitting apparatus using a light emitting diode (LED) which is characterized in that it is adapted to a billboard used at a diner, a restaurant, a highway rest area, etc., multiple billboards each having an advertisement text, an image, a graphic, a photo, etc. are selectively engaged and emit lights using a light emitting diode (LED) which can be well recognized at day and night time. The multi-sectioned billboard-mounted light-emitting device 1 comprises an engaging frame 2 configured in such a way that a plurality of billboard accommodation spaces 10 are selectively formed at its front side as one or multiple section base 9 are detachably inserted and engaged between an upper engaging part 5 and a lower part 4 which are horizontally provided upward and downward in a frame shape, and a lower accommodation groove 6 is formed in a longitudinal direction at a back side of an upper surface of the lower part 4; a light emitting diode module 18 which is positioned in an accommodated state while matching with an inner bottom surface of the lower accommodation groove 6 of the lower part 4, and a printed circuit board 19 having a corresponding length is provided at a lower side of a light guide plate 22, and a plurality of light emitting diodes (LED) 20 are mounted at regular intervals on the upper surface of the printed circuit board 19; a light guide plate 22 which is made from a transparent plate matching to an inner side of the engaging frame 2, and a plurality of scanning lines 23 are formed in cut states in horizontal and vertical directions at its back side, and the LEDs 20 are installed close at the lower side, and lights from the LEDs 20 travel along the scanning lines 23 and are reflected and emit; a back plate 24 which comes into close contact with the back side of the light guide plate 22 and emits light from the light guide plate 22 to the front side; and a billboard 26 on which are printed various texts, images or photos and which is detachably accommodated in each billboard accommodation space 10 in a certain size which is divided by a section bar 9 of the engaging frame 2 and is installed at a front side of the light guide plate 22.

Figure 3:
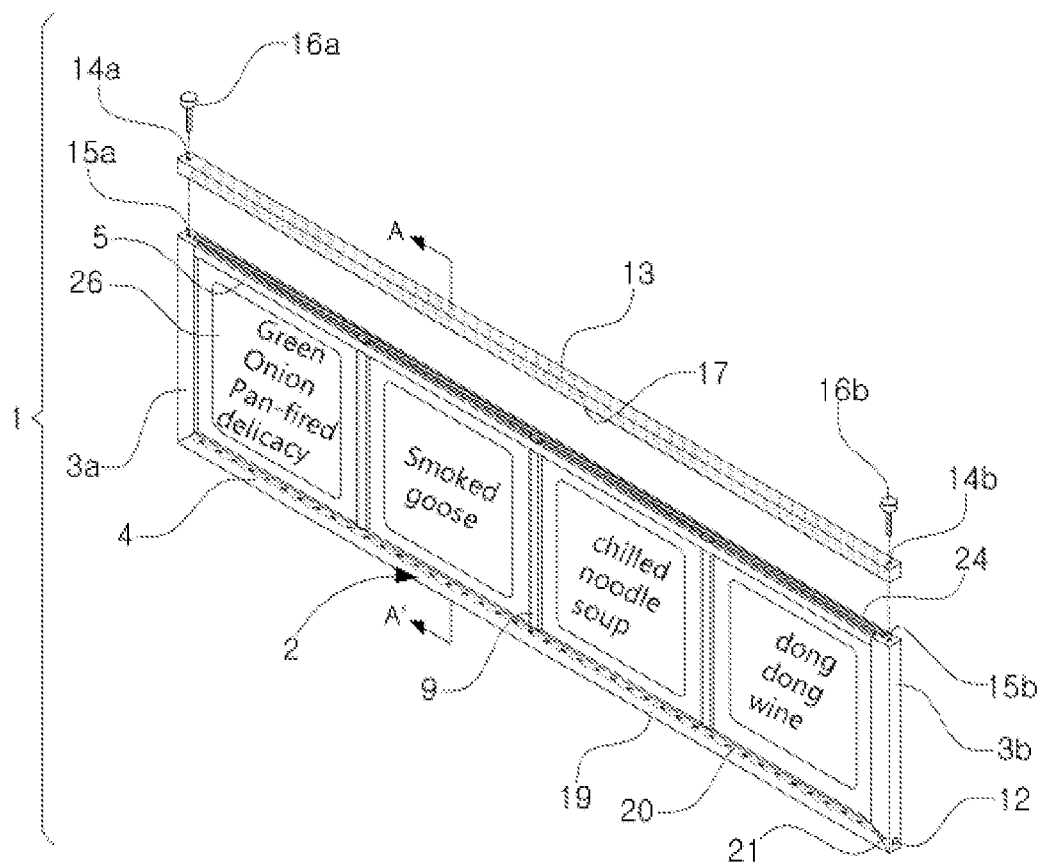
FIG. 3 is a schematic perspective view illustrating a state that a light guide plate, a light emitting diode module, a plurality of section bars and a billboard are assembled in the interior of an engaging frame of a multi-sectioned billboard-mounted light-emitting device according to the present invention.
Figure 4:
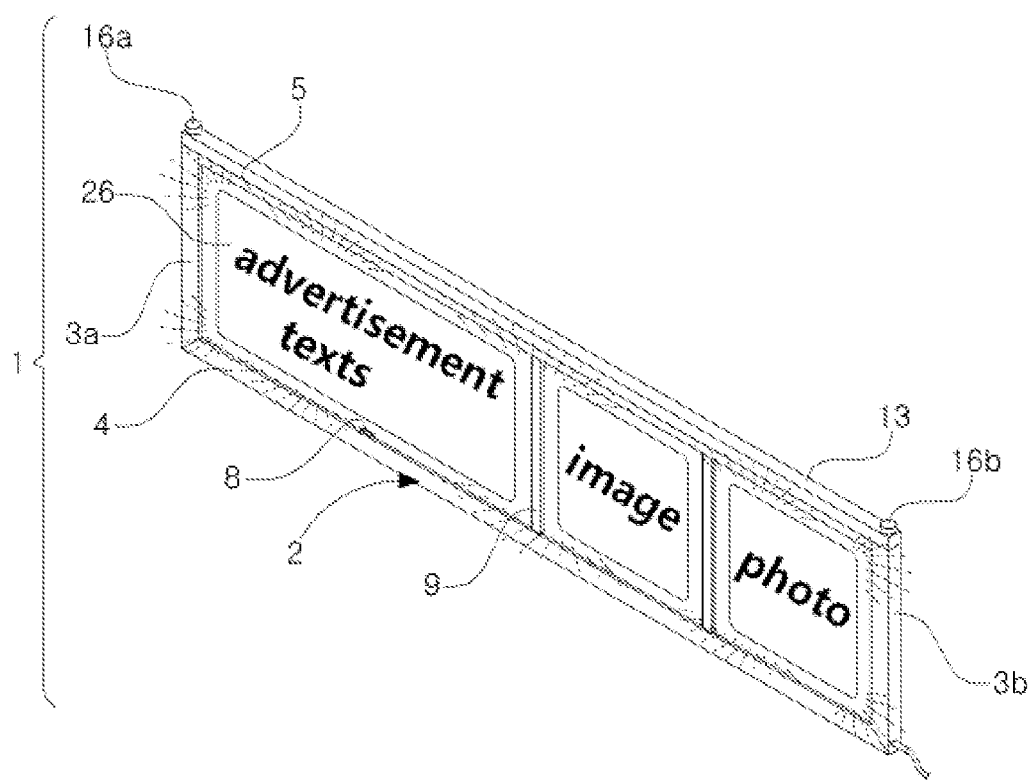
FIG. 4 is a schematic perspective view illustrating a state that one section bar is installed in the interior of an engaging frame, so the billboard with the expanded width can be disposed therein in the multi-sectioned billboard-mounted light-emitting device according to the present invention.
Figure 5:
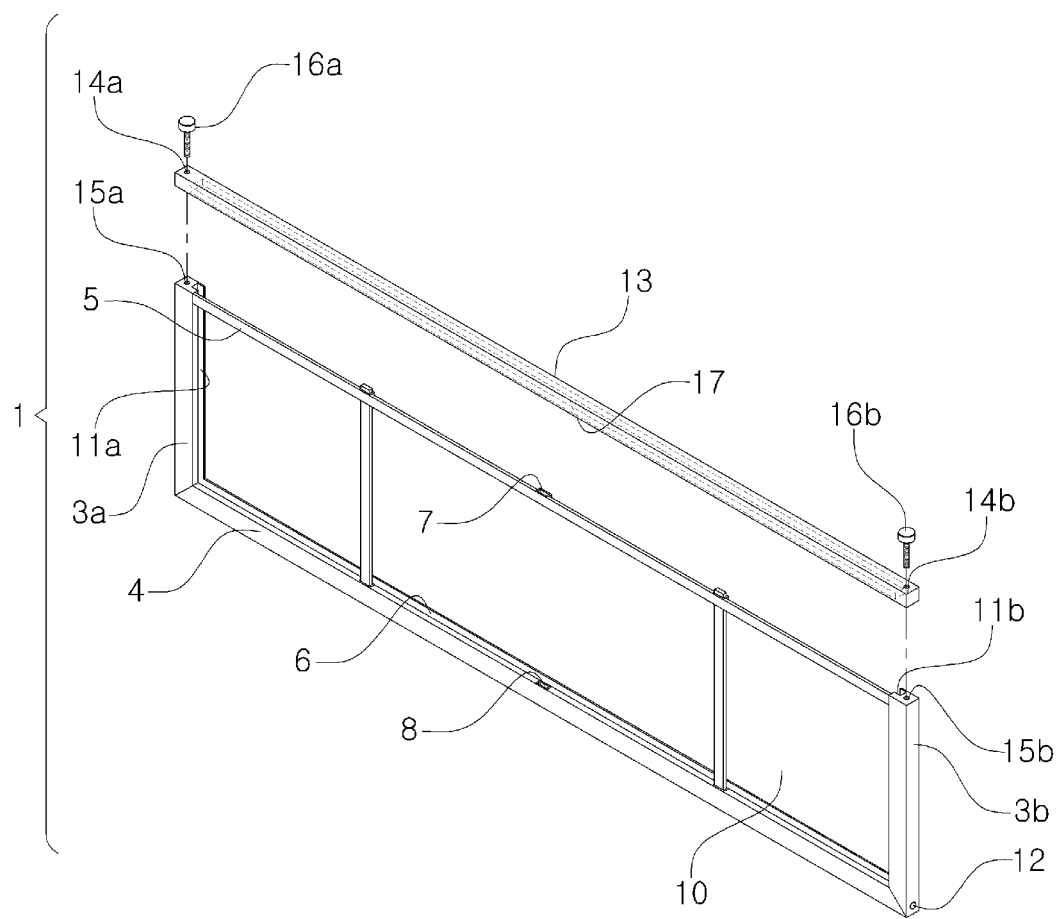
FIG. 5 is a schematic perspective view illustrating a state that an engaging frame is disengaged from a multi-sectioned billboard-mounted light-emitting device according to the present invention.
Figure 6:
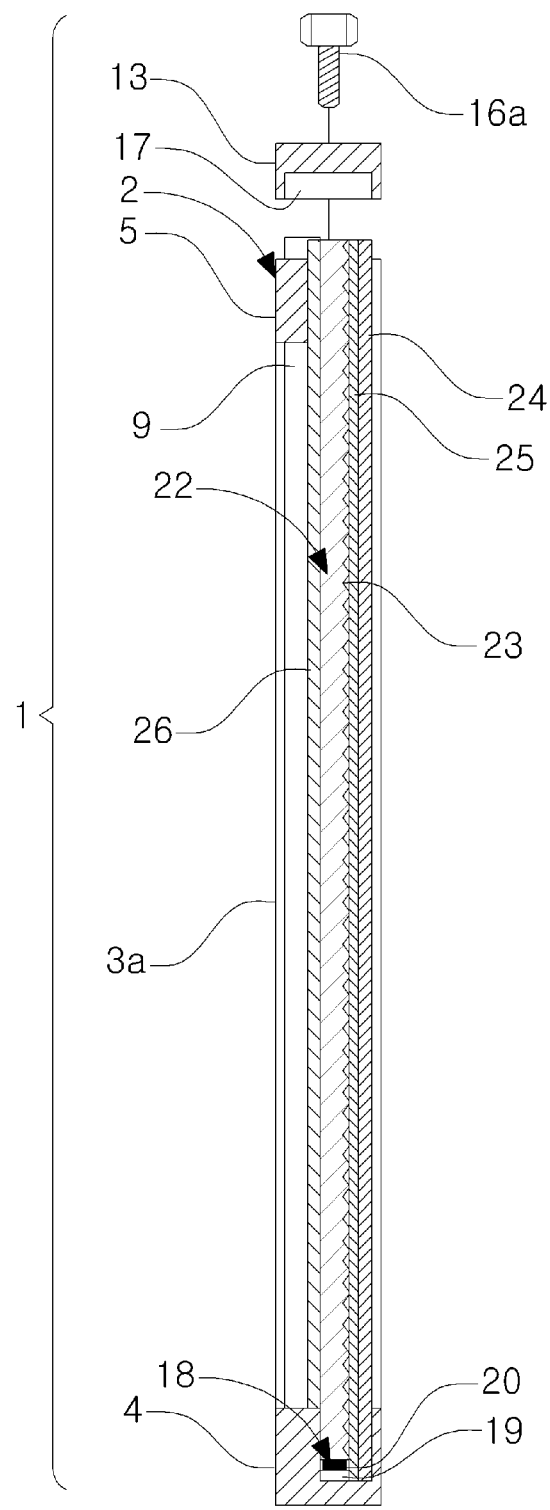
FIG. 6 is a schematic cross sectional view taken along A-A' of FIG. 3.
Figure 7:
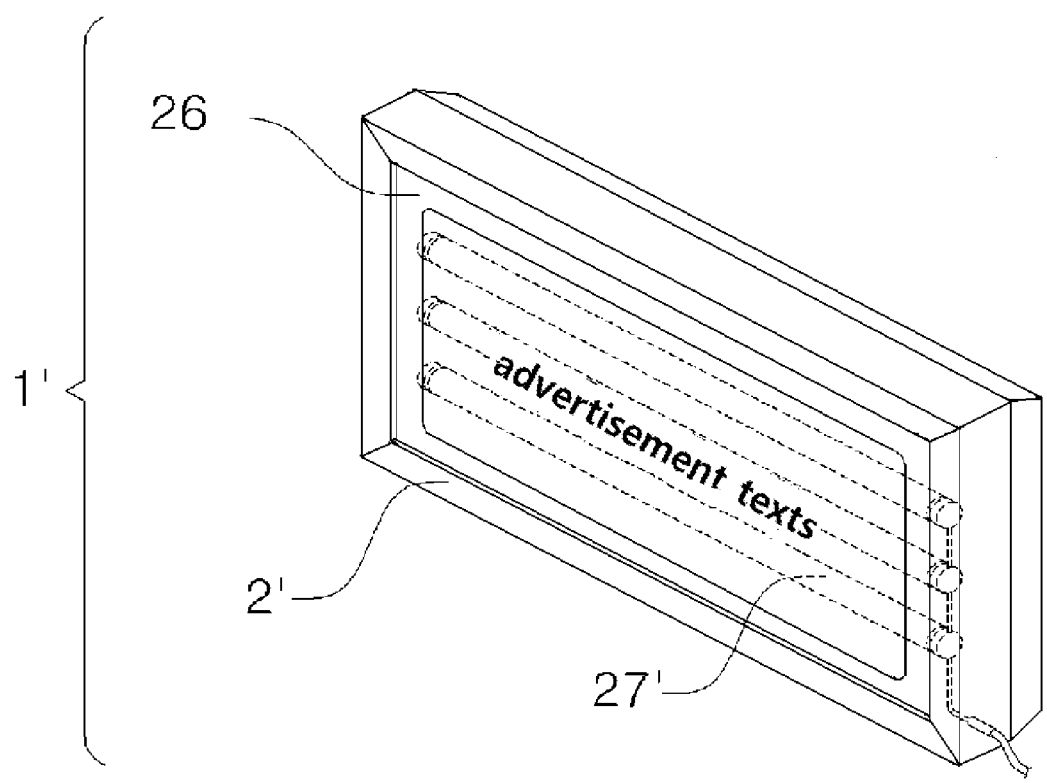
FIG. 7 is a schematic perspective view of a conventional light emitting device for an advertisement.

The engaging frame 2, as shown in FIGS. 1 to 6, is formed in a rectangular frame shape which is prolonged in a horizontal direction and is directed to a portion at an inner side of which are provided the light guide plate 22, the light emitting diode module 18, the billboard 26 and the back plate 24. At the left and right sides are vertically provided side parts 3a and 3b. The lower part 4 is integrally fixed in a horizontal direction at a lower side between the side parts 3a and 3b. At an upper front side between the side parts 3a and 3b is integrally provided an upper engaging part 5 which is thinner than the side parts 3a and 3b and the lower part 4, and the front and back sides are open in a rectangular frame shape which is long in left and right directions. The lower part 4 has a lower accommodation groove 6 at a back side of the upper surface in a longitudinal direction. As shown in FIG. 6, the inner bottom surface of the lower accommodation groove 6 is formed deep enough to fit the bar-shaped light emitting diode module 18, and the lower side of the light guide plate 22 is positioned at the upper side of the light emitting diode module 18 in the lower accommodation groove 6, and the light guide plate 22 is vertically installed at the end of the engaging frame 2. As shown in FIGS. 1 and 5, at the upper front side of the lower part 4 are provided a plurality of section bar lower engaging parts 8 at regular intervals. At the back side of the upper engaging part 5 are provided a plurality of section bar upper engaging parts 7 at the positions matching with the section bar lower engaging parts 8 in the upward and downward positions. One or multiple section bars 9 are detachably inserted vertically between the section bar upper engaging part 7 of the upper engaging part 5 and the section bar lower engaging part 8 of the lower part 4. As shown in FIG. 5, the engaging interval of the section bar 9 can be freely determined depending on a user's selection, so a plurality of the billboard accommodation spaces 10 with different widths are formed at the front side of the engaging frame 2. The billboard 26 with a certain size is vertically inserted into the billboard accommodation space 10 while coming into close contact with the front side of the light guide plate 22 positioned at the back side, thus emitting lights.

Figure 2:
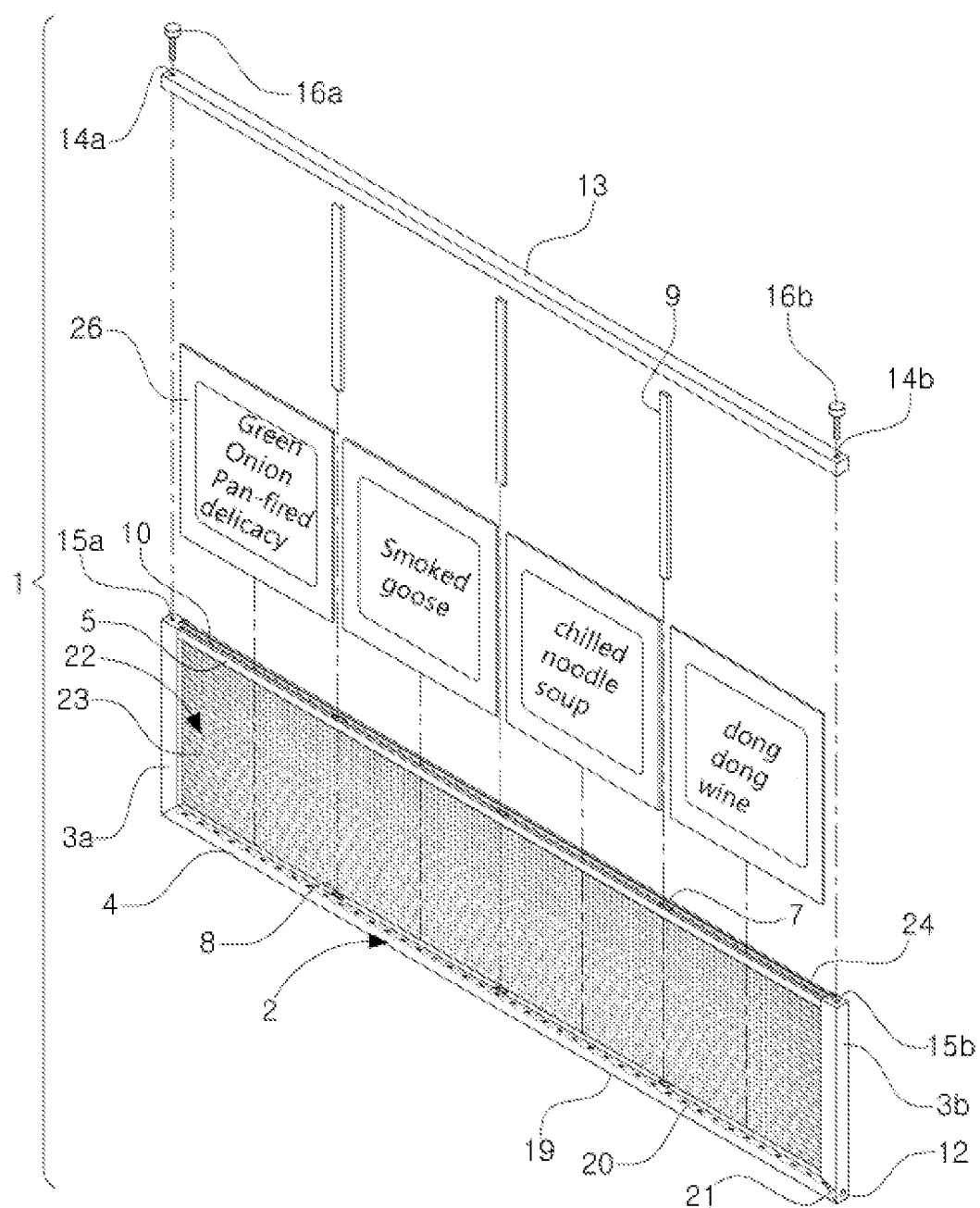
FIG. 2 is a schematic perspective view illustrating a state that a plurality of section bars and billboards are assembled and installed in a state that a light guide plate and a light emitting diode module are disposed in the interior of an engaging frame in a multi-sectioned billboard-mounted light-emitting device according to the present invention.

As shown in FIGS. 2, 3, 6, the lower accommodation groove 6 is configured to receive the lower side of the back plate 24 installed at the back side of the light guide plate 22, so the light guide plate 22 and the back plate 24 can be vertically installed in a stable state.

In addition, as shown in FIGS. 1 and 5, the side parts 3a and 3b include side accommodation grooves 11a and 11b in the vertical direction at the inner back side. The side accommodation grooves 11a and 11b are formed on the same plane as the lower accommodation groove 6, so the light guide plate 22 installed at the back side of the engaging frame 2 and the left and right ends of the back plate 24 are inserted and maintain a vertical state. An electric power connection hole 12 is formed at the lower side of one of the side parts 3a and 3b. An external electric power cable is extended via the electric power connection hole 12, so the electric power connection terminal 21 of the light emitting diode module 18 installed on the inner bottom surface of the lower accommodation groove 6 is connected with an external electric power cable, so electric power can be supplied.

As shown in FIGS. 1 to 6, the side parts 3a and 3b are installed in such a way that a long bar shaped upper cover 13 is detachably installed at the upper surface and has a length matching with the length between the side part 3a of one side and the side part 3b of the other side, so the light guide plate 22 installed in the inner side of the engaging frame 2 and the back plate 24 and the billboard 26 do not escape toward the upper side. The upper cover 13 has through holes 14a and 14b at the left and right ends, and at the upper sides of the side parts 3a and 3b are formed female screw holes 15a and 15b at the portions matching with the through holes 14a and 14b. The fixing bolts 16a and 16b pass through the through holes 14a and 14b and the female screw holes 15a and 15b, so the upper cover 13 can be detachably engaged.

According to another embodiment of the present invention, the upper cover 13 has an upper insertion groove 17 formed at the lower surface in a longitudinal direction. As shown in FIG. 6, the section bar 9 and the billboard 26 partially protruded from the upper outer side of the engaging frame 2 are inserted into the upper insertion groove 17 while matching with the upper sides of the light guide plate 22 and the back plate 24, so the upper side can be stably fixed. At the inner side of the upper insertion groove 17 is installed another light emitting diode module (not shown) if necessary, in proximity to the upper surface of the light guide plate 22, so light can be plane-emitted from the upper side of the light guide plate 22, thus facilitating the light guide plate 22 to plane-emit more light.

As shown in FIGS. 1 to 3 and 6, the light emitting diode module 18 is positioned in an accommodated state while matching with the inner bottom surface of the lower accommodation groove 6 of the lower part 4, so the light guide plate 22 can plane-emit light from the LED (Light Emitting Diode) 20. At the lower side of the light guide plate 22 is provided a printed circuit board 19 having a certain length matching with the lower side of the light guide plate 22. At the upper surface of the printed circuit board 19 is provided a plurality of LEDs 20 at regular intervals which are circuit-connected. The lower side of the light guide plate 22 positioned on the top of the light emitting diode module 18 comes into close contact with the LED 20 of the light emitting diode module 18, so the light guide plate 22 plane-emits light with the aid of the light from the LED 20.

In addition, the light emitting diode module 18 has an electric power connection terminal 21 at one end of the printed circuit board 19, so it is connected with an external electric power via the electric power connection hole 12 formed at the lower side of one of the side parts 3a and 3b, so electric power is supplied to the light emitting diode module 18.

The vertically installed light guide plate 22 is configured to plane-emit light by means of the light emitting diode module 18 which is thin and is bar-shaped, so the thickness of the whole light emitting apparatus 1 can be made slim, which makes it easy to install and engage.

As shown in FIGS. 1 to 3 and 6, the light guide plate 22 is made from a transparent plate fitting the inner side of the engaging frame 2 and is configured to plane-emit light with the aid of the light emitting diode module 18 which is installed in proximity to the lower side. It is made from a transparent plastic or a glass in a shape of a plate which is long in left and right directions, and the thickness of it matches with the width of the LED 20 of the light emitting diode module 18 or is thicker than it. Most of the light from the LED 20 reaches the inner side of the light guide plate 22, and a plurality of scanning lines 23 in horizontal and vertical directions are cut and formed on the back side. The LED 20 of the light emitting diode module 18 installed on the inner bottom surface of the lower accommodation groove 6 is installed in proximity at the lower side in state it is inserted in the lower accommodation groove 6 of the lower part 4. The light from the LED 20 moves along the plurality of the scanning lines 23 and is reflected toward the front side in the interior of the light guide plate 22, so the whole surface of the light guide plate 22 plane-emit light uniformly. The left and right ends of the light guide plate 22 are inserted into the side accommodation grooves 11a and 11b formed at the inner side surfaces of the side parts 3a and 3b and remain in a stable state.

The scanning lines 23 are densely formed at regular intervals on the whole back surfaces of the light guide plate 22, and as shown in FIG. 6, the cross section of it is cut in a V-shape, and the light straight traveling from the LED 20 of the light emitting diode module 18 reaches the scanning lines 23 cut in a V-shape and is reflected toward the front surface of the light guide plate 22, so the light can be plane-emitted from the whole surfaces of the light guide plate 22.

In addition, the scanning lines 23 grow narrower in the directions of the upper side or left and right sides of the light guide plate 22, so the light can focus on the upper side of the light guide plate 22 positioned far from the LED 20 of the light emitting diode module 18 installed close to the lower side and the left and right portions, so the light can be uniformly plane-emitted from the light guide plate 22.

As shown in FIGS. 1 to 3 and 6, the back plate 24 comes into close contact with the back side of the light guide plate 22, so the light from the light guide plate 22 can travel toward the front side. It is formed in a rectangular plate shape matching with the inner side of the engaging frame 2, and the lower side of it is accommodated in the lower accommodation groove 6 of the lower part 4, and the left and right ends are accommodated in the side accommodation grooves 11a and 11b of the side parts 3a and 3b and maintain a vertically standing stable state. The reflection film 25 is positioned on the front side or it can be integrally attached, so the light scanned toward the back surface of the light guide plate 22 is reflected toward the front side, thus enhancing the front surface light emission efficiency of the light guide plate 22.

As shown in FIGS. 1 to 4 and 6, the billboard 26 features in that it is made from a vertically arranged transparent plate on which are printed various texts, images, photos, etc. and it is detachably accommodated in each billboard accommodation space 10 sectioned to different sizes by means of the section bars 9 of the engaging frame 2 while matching with the sizes. Various advertisement texts, images, photos, etc. can be easily visible at day and night with the aid of the light guide plate 22 which is positioned close to the front side of the light guide plate 22 while plane-emitting lights. As shown in FIG. 1, the billboard 26 is inserted while standing upward and downward in each billboard accommodation space 10 in a vertically standing state between the side parts 3a and 3b and the section bars 9 of the engaging frame 2. As shown in FIG. 3, in a state that each billboard 26 snug-fits, the upper front side remains closed by means of the upper engaging part 5 positioned at the upper front side, so it does not escape toward the front outer side. The billboard 26 is partially more protruded upward than the upper engaging part 5 in a state that it is inserted in the billboard accommodation space 10 and is fixedly inserted in the upper insertion groove 17 of the upper cover 13 installed on the top of the engaging frame 2. The billboard 26 can be easily replaced via the protruded upper side of the billboard 26.

In addition, as shown in FIGS. 2 and 3, when the billboard accommodation space 10 is sectioned into multiples parts of same sizes as the section bars 9 are engaged at the engaging frame 2 at regular intervals, the multiple billboards 26 having the same matching sizes are inserted and engaged to each billboard accommodation space 10, and as shown in FIGS. 4 and 5, even when it is sectioned to form the billboard accommodation spaces 10 of different sizes as the section bars 9 are not engaged at regular intervals in the engaging frame 2, the billboard 26 having matching sizes can be inserted and engaged to each billboard accommodation space 10, so multiple billboards 26 of different sizes can be inserted into one engaging frame 2 and the light guide plate 22, thus emitting lights, so a high visibility can be obtained at day and night with lower power consumption.

The operation of the present invention will be described below.

When the multi-sectioned billboard-mounted light-emitting device 1 according to the present invention is made to be easily visible at day and night in such a way that it is adapted to a menu plate used at various diners, restaurants, highway rest areas, etc., and multiple sheets of billboards 26 of different sizes on which are printed various advertisement texts, images, graphics, photos, etc. are selectively exchanged or engaged while emitting light, as shown in FIGS. 1 and 2, the long bar-shaped light emitting diode module 18 is horizontally inserted into the lower accommodation groove 6 formed at the back side of the lower part 4 of the engaging frame 2, and the lower side of the light guide plate 22 is positioned at the lower accommodation groove 6 in which is installed the light emitting diode module 18. The LED 20 of the light emitting diode module 18 is installed in close contact with the lower side of the light guide plate 22, so the light from the LED 20 of the light emitting diode module 18 is emitted toward the inner side of the light guide plate 22 and travels along a plurality of scanning lines 23 formed in the vertical and horizontal directions on the back surface of the light guide plate 22 and is reflected toward the front side of the light guide plate 22, so the light can be emitted from the whole portions of the light guide plate 22. The back plate 24 to which is attached a reflection film 25 is installed at the back side of the light guide plate 22 for the purpose of enhancing light emission efficiency at the front side of the light guide plate 22.

Next, one or multiple section bars 9 are inserted and engaged in vertical directions into between the section bar upper engaging parts 7 formed at regular intervals at the upper engaging part 5 of the engaging frame 2 and the section bar lower engaging parts 8 formed at regular intervals at the front side of the lower part 4 while freely adjusting the engaging interval depending on the user's selection. As shown in FIG. 5, a plurality of billboard accommodation spaces 10 having different widths are formed at the front side of the engaging frame 2, and as shown in FIGS. 3 and 4, the billboards 26 of different matching sizes are vertically inserted and engaged to each billboard accommodation space 10 and are forced to come into close contact with the front side of the light guide plate 22 positioned at the back side, so various advertisement texts, images, photos, etc. printed on each billboard 26 can become visible as the light guide plate 22 plant-emits lights, while enhancing visibility. The upper cover 13 is fixedly engaged to the upper side of the engaging frame 2 using fixing bolts 16a and 16b in a state that the multiple billboards 26 are engaged to the engaging frame 2, so the billboards 26, the light guide plates 22 and the back plate 24 cannot separate.

When it is needed to exchange the billboard 26 of a different size in the light emitting apparatus 1, it is needed to adjust the size of the billboard accommodation space 10 to the size of another billboard 26, which is to be installed, by adjusting the engaging interval of the section bar 9 in a state that the upper cover 13 is separated, and the billboard 26 is inserted and engaged, so it is possible to easily exchange various billboards 26 of different sizes that the user wants.

INDUSTRIAL APPLICABILITY

The multi-sectioned billboard-mounted light-emitting device according to the present invention can be well applied to the menu plates used at various diners, restaurants, highway rest area, etc., so the visibility can be enhanced at day and night by installing the billboards of different sizes on which are printed various advertisement texts, images, graphics, photos, etc. in one light emitting apparatus. The thickness of the whole apparatus is small, and the installation and engagement are easy, so a light emitting apparatus for an advertisement can be provided, which efficiently emits lights with the aid of one light emitting diode module. The present invention can be well and widely applied to various LED billboards, LED menu plates, etc.

The invention claimed is:

1. A multi-sectioned billboard-mounted light-emitting device, comprising;
    an engaging frame configured in such a way that a plurality of billboard accommodation spaces are selectively formed at its front side, one or multiple section bars are detachably inserted and engaged between an upper engaging part and a lower part which are horizontally provided upward and downward in a frame shape, and a lower accommodation groove is formed in a longitudinal direction at a back side of an upper surface of the lower part;
    a light emitting diode module which is positioned in an accommodated state while matching with an inner bottom surface of the lower accommodation groove of the lower part, and a printed circuit board having a corresponding length is provided at a lower side of a light guide plate, and a plurality of light emitting diodes (LED) are mounted at regular intervals on the upper surface of the printed circuit board;
    a light guide plate which is made from a transparent plate matching, to an inner side of the engaging frame, and a plurality of scanning lines are formed in cut states in horizontal and vertical directions at its back side, and the LEDs are installed close at the lower side, and lights from the LEDs travel along the scanning lines and are reflected and emit;
    a back plate which comes into close contact with the back side of the light guide plate and emits light from the light guide plate to the front side; and
    a billboard on which are printed various texts, images or photos and which is detachably accommodated in each billboard accommodation space in a certain site which is divided by a section bar of the engaging frame and is installed at a front side of the light guide plate.

2. The multi-sectioned billboard-mounted light-emitting device according to claim 1, wherein the engaging frame has side pans and vertically positioned at left and right sides, and a lower part is horizontally positioned and is integrally fixed at a lower side between side parts and, and an upper engaging part having a thickness thinner than the side parts and the lower part is integrally and fixedly engaged at an upper front side between the side parts and is formed in a rectangular frame shape the front and back sides of which are open, and the lower part has a plurality of section bar lower engaging parts at regular intervals at the upper front side, and a plurality of section bar upper engaging, parts are formed at regular intervals at the back side of the upper engaging part while matching upward and downward with the section bar lower engaging, pan, and one of multiple section bars are detachably inserted and engaged into between the section bar upper engaging part of the upper engaging part and the section bar lower engaging part of the lower part upwardly and downwardly in vertical directions, so the engaging intervals of the section bars can be freely adjusted depending on a user's selection, so a plurality of billboard accommodation spaces of different widths can be formed at the front side of the engaging frame.

3. The multi-sectional billboard-mounted light-emitting device according to claim 1, wherein the engaging frame has side accommodation grooves formed at the inner back side of side parts disposed in standing states at left and right sides, and the side accommodation grooves are formed on the same planes as the lower accommodation groove, and the left and right ends of the light guide plate and the back plate installed at the back side of the engaging frame are inserted into them while maintaining a vertically standing state, and an electric power connection hole is formed at the lower sides of the side parts, and an external electric, power cable is installed via the electric power connection hole, and the electric power connection terminal of the light emitting diode module installed, on the inner bottom surface of the lower accommodation groove is connected with an external electric power cable.

4. The multi-sectioned billboard-mounted light-emitting device according to claim 1, wherein the engaging frame is configured in such a way that a long bar-shaped upper cover having a length matching with the length between a side part of one side and a side part of the other side is detachably installed on the upper side of the side part which are disposed in a vertically standing state at left and right sides, and the upper cover has through holes at left and right ends, and female screw holes are formed at the portions upward and downward matching with the through holes are formed on the upper portions of the side parts, and fixing bolts pass through the through holes and the female screw holes, so the upper cover is detachably engaged, and an upper insertion groove is formed in a longitudinal direction at the lower side of the upper cover, and the upper sides of the section bars the billboard and the light guide plate, which are partially protruded from the upper and outer sides of the engaging frame are matched and fixedly inserted into the upper insertion groove.

5. The multi-sectioned billboard-mounted light-emitting device according to claim 1, wherein the scanning, lines are densely formed at regular intervals on the whole portions of the back side of the light guide plate, and their cross sections are cut in −V shape, so the light straight coming in from the LEDs of the light emitting diode module reaches the V-shaped cut scanning lines and are reflected toward the front side of the light guide plate and spread on the front side of the light guide plate, so light is plane-emitted, and the scanning lines grow narrower in their widths toward the upper side or left and right sides of the light guide plate, so the light from the LEDs focuses on the upper side or left and right sides of the light guide plate positioned far from the LEDs of the light emitting diode module installed closer to the lower side, so the whole portions of the light guide plate uniformly plane-emits lights.

6. The multi-sectioned billboard-mounted light-emitting device according to claim 1, wherein the back plate is formed in a rectangular plate shape matching with the inner side of the engaging frame, and its lower side is accommodated in the lower accommodation groove of the lower part, and its left and right side ends are accommodated in side accommodation grooves of side parts in vertically standing states, and a reflection film is disposed or integrally and fixedly fixed to its front side, so the light emitted toward the back side is reflected to the front side.

7. The multi-sectioned billboard-mounted light-emitting device according to claim 2, wherein the engaging frame has side accommodation grooves formed at the inner back side of side parts disposed in standing states at left and right sides, and the side accommodation grooves are formed on the same planes as the lower accommodation groove, and the left and right ends of the light guide plate and the back plate installed at the back side of the engaging frame are inserted into them while maintaining a vertically standing state, and an electric power connection hole is formed at the lower sides of the side parts, and an external electric power cable is installed via the electric, power connection hole, and the electric power connection terminal of the light emitting diode module installed on the inner bottom surface of the lower accommodation groove is connected with an external electric power cable.

8. The multi-sectioned billboard-mounted light-emitting device according, to claim 2, wherein the engaging frame is configured in such a way that a long bar-shaped upper cover having a length matching with the length between a side part of one side and the side part of the other side is detachably installed on the upper side of the side part which are disposed in a vertically standing state at left and right sides, and the upper cover has through holes at left and right ends, and female screw holes are formed at the portions upward and downward matching with the through holes are formed on the upper portions of the side parts, and fixing bolts pass through the through holes and the female screw holes, so the upper cover is detachably engaged, and an upper insertion groove is formed in a longitudinal direction at the lower side of the upper cover, and the upper sides of the section bars the billboard and the light guide plate, which are partially protruded from the upper and outer sides of the engaging frame are matched and fixedly inserted into the upper insertion groove.

* * * * *